(12) United States Patent  
Witte

(10) Patent No.: US 8,035,639 B2
(45) Date of Patent: Oct. 11, 2011

(54) METHOD AND APPARATUS FOR DETERMINING THE ALTERATION OF THE SHAPE OF A THREE DIMENSIONAL OBJECT

(76) Inventor: Gerhard Witte, Langenfeld (DE)

(*) Notice: Subject to any disclaimer, the term of this patent is extended or adjusted under 35 U.S.C. 154(b) by 1020 days.

(21) Appl. No.: 11/871,623

(22) Filed: Oct. 12, 2007

(65) Prior Publication Data

US 2009/0002364 A1    Jan. 1, 2009

(30) Foreign Application Priority Data

Oct. 13, 2006  (DE) .......................... 10 2006 048 578

(51) Int. Cl.
*G06T 15/00*  (2006.01)

(52) U.S. Cl. ........ 345/419; 345/427; 382/100; 382/103; 382/141; 348/370; 701/129; 702/35

(58) Field of Classification Search .................. 345/419, 345/427; 382/132, 141, 100, 103; 701/29, 701/35, 301, 129; 348/370; 702/35
See application file for complete search history.

(56) References Cited

U.S. PATENT DOCUMENTS

| | | | |
|---|---|---|---|
| 4,435,769 A | 3/1984 | Nagano et al. | |
| 6,912,293 B1 * | 6/2005 | Korobkin | 382/100 |
| 7,596,242 B2 * | 9/2009 | Breed et al. | 382/103 |
| 2002/0161533 A1 * | 10/2002 | Uegaki | 702/35 |
| 2006/0268153 A1 * | 11/2006 | Rice et al. | 348/370 |
| 2007/0288135 A1 * | 12/2007 | Kidd et al. | 701/29 |
| 2008/0267487 A1 * | 10/2008 | Siri | 382/141 |

FOREIGN PATENT DOCUMENTS

| | | |
|---|---|---|
| EP | 1 204 060 | 5/2002 |
| EP | 1 603 054 | 12/2005 |
| EP | 1 640 228 | 3/2006 |
| JP | 2001250009 | 9/2001 |
| JP | 2001338090 | 12/2001 |
| JP | 2002329101 | 11/2002 |
| WO | WO 2005/109263 | 11/2005 |
| WO | WO 2006/065551 A2 | 6/2006 |

OTHER PUBLICATIONS

German Office Action dated Oct. 23, 2009.

* cited by examiner

*Primary Examiner* — Kimbinh T Nguyen
(74) *Attorney, Agent, or Firm* — RatnerPrestia

(57) ABSTRACT

A method for determining the alteration of the shape of a three-dimensional object from at least one two-dimensional image of the object, wherein the original three-dimensional model shape of the object is known—or is ascertained from the at least one two-dimensional image of the object. The three-dimensional model shape is rotated such that at least one two-dimensional projection of the three-dimensional model shape matches or resembles at least one partial area or contour of the at least one two-dimensional image of the object, and the area or areas are ascertained in which the at least one two-dimensional image of the object deviates from the two-dimensional projection(s) of the three-dimensional model shape, wherein the deviating two-dimensional area or areas are identified as deformed areas and, after the deformed area or areas have been back-projected onto the three-dimensional model shape, the three-dimensional deformation of the three-dimensional object is ascertained.

14 Claims, 2 Drawing Sheets

METHOD AND APPARATUS FOR DETERMINING THE ALTERATION OF THE SHAPE OF A THREE DIMENSIONAL OBJECT

BACKGROUND OF THE INVENTION

The present invention relates to a method and device for determining the alteration of the shape or also the value of a three-dimensional object, in particular a motor vehicle, which has been partially deformed, for example due to an accident, and for example comprises a dent or a pressed-in frontal section.

If, starting from their original state or a state which is to be regarded as new, objects are deformed, for example by the action of an external force, such that for example a car door has a dent after a stone has hit it, or a boot lid is pinched by being pressed in, then these deformed areas are regarded as being damaged, which may result in an insurance payment having to be made. Since such deformations can occur to different extents on different areas, it is necessary to record and if possible quantify said deformation, in order for example to ascertain the loss in value caused by said deformation.

In order to assess the level of damage to a vehicle which has been damaged in an accident, there are damage calculation systems with the aid of which the expected repair costs can be determined. These systems are based on a motor vehicle expert visually identifying the damaged components, determining—depending on the severity of the damage—whether said components can be repaired or have to be replaced, and then transmitting this information to an electronic data processing system. The replacement part prices and the work respectively required in order to exchange said parts are stored in said electronic data processing system. These systems also have a repair logic for when it is not a matter of only one component but rather of several components which are connected to each other and have to be replaced. Said program then also identifies the amount of the repair costs, on the basis of the replacement parts to be replaced and/or repaired. Such methods have been provided in Germany for decades by the companies Audatex and DAT.

Storing an index table—in which a component name and an operation are designated—in a memory, in order to estimate repair costs for a vehicle, is known from JP 2001250009.

JP 2001338090 discloses a system comprising different display modes, in order to estimate the repair costs of a vehicle in accordance with a user's experience.

A system for estimating the costs of a repair to a motor vehicle is known from JP 2002329101, wherein a memory for replacement parts, together with corresponding replacement part prices, is provided.

A device for producing cost estimates for repairs to automobiles is known from U.S. Pat. No. 4,435,769 and the corresponding document DE 31 10 788 A1, wherein a parts file for storing replacement part data is provided.

A method and device for determining characteristic properties of a motor vehicle is known from EP 1 603 054 A1, wherein a database is provided in which characteristic properties are stored for a plurality of groups of motor vehicles which are respectively identical in type. The characteristic properties of the motor vehicle are retrieved from the database with the aid of a motor vehicle identification key.

SUMMARY OF THE INVENTION

It is an object of the present invention to propose a method and device for simply determining the alteration of the shape of a three-dimensional object from at least one two-dimensional image of the object.

This object is solved by the subjects of the independent claims. Advantageous embodiments follow from the dependent claims.

In a method in accordance with the invention for determining the alteration of the shape of a three-dimensional object, such as for example a motor vehicle involved in an accident, at least one two-dimensional image of the object is produced at the scene of the accident, for example by one or more photographic recordings. This at least one two-dimensional image or recording of the object is transmitted, for example as an MMS by means of a mobile telephone, via internet or by other transmission methods, to a computational unit which can also be situated at the scene of the accident itself. The original, non-deformed three-dimensional shape of the object which is deformed on the two-dimensional image can for example be stored in a database of the computational unit or can also be reconstructed from the two-dimensional image of the object. The type of the motor vehicle involved in the accident can for example be inputted into the computational unit or ascertained from the two-dimensional image, for example on the basis of a logo or characteristic shape of the body, such that the original and non-deformed three-dimensional model shape of the object can be loaded into the computational unit from a database in which for example the geometry and dimensions of all common motor vehicle models are stored. Alternatively, it is also possible to ascertain what the three-dimensional, non-deformed shape of the object must have been like, from one or more two-dimensional images of the deformed object, by estimating on the basis of known or typical dimensions of the object or automobile, wherein contours and silhouetting can be worked out, in order to ascertain in practice the deviation in the lines and thus the deformation, merely on the basis of the shape profile of the lines. The three-dimensional model shape of the object, uploaded from a database or ascertained by estimation, is then rotated and/or shifted in the computational unit relative to the recording or recordings of the deformed object, such that the projection of the three-dimensional model shape onto the at least one two-dimensional recording of the object actually taken matches or resembles it as well as possible. Methods for comparing two two-dimensional images or contours of objects are known in the prior art and are also often referred to as "matching" methods.

After the recorded two-dimensional image(s) of the deformed object has/have been back-projected onto the three-dimensional model shape which is orientated relative to the image or images, it is then possible to ascertain the area or areas in which the three-dimensional shape of the deformed object, as obtained from the back-projections of the two-dimensional images of the object, deviates from the three-dimensional model shape.

In the method in accordance with the invention, photogrammetry methods can also be used to reconstruct a three-dimensional shape, from the recordings of the deformed object, which can be compared with a non-deformed model shape in order to ascertain the position and size of the deformation(s) present.

Equally, it is also possible to ascertain the area or areas in which the two-dimensional image of the deformed object deviates from the two-dimensional projection of the non-deformed three-dimensional model shape.

The comparisons between the non-deformed model shape and the images of the deformed object provided information on the area of the non-deformed three-dimensional object in which there are deformed areas which can be identified on the two-dimensional image of the three-dimensionally deformed object.

Alternatively or additionally, it is also possible to compare the recording(s) of the deformed object with models—or reference recordings containing reference deformations of the object—which are for example stored in a database, in order to ascertain whether one or more of the reference deformations are present.

Thus, even if only one photograph of a deformed three-dimensional object—such as for example a damaged vehicle—is available, it is possible to estimate the extent of the damage on the basis of the available photograph, even without calling in an expert, and to then transmit this to one of the damage calculation systems described above.

Motor vehicles or automobile parts, such as for example the body, are preferably examined for deformations using the method described above, wherein the method can also be used with other objects.

It is also possible for the deformation of a three-dimensional object to be detected or ascertained on the basis of the incidence of light or silhouetting which can be identified on a recording. On a photo of a dented area which in its initial state was almost or completely plane, such as for example the outer side of a vehicle door, it is for example possible, on the basis of the difference in brightness which can be identified on a photograph in the area of the deformation, to ascertain that there is a deformation. Equally, it is also possible to determine the extent of the deformation, if reference values are included on the photographic image, such as for example a door handle whose dimensions are known, or the profile of an edge or other distinct element which exhibits known dimensions stored for example in a database.

In accordance with another aspect, the invention relates to a method for determining the damage or level of damage to a motor vehicle, wherein the deformation of the motor vehicle can be ascertained using a method as described above. In accordance with a first aspect, it is then possible, as described above, to ascertain the level of damage to the vehicle which can be identified on the image or images, by comparing this with a reference damage model, such as for example by comparing it with a motor vehicle model of the same type which has already been examined and quantified with respect to the level of damage and which is damaged in the same or approximately the same area.

The damaged exterior parts can generally be very easily identified in a two-dimensional image, and a motor vehicle expert generally knows which interior parts have most probably also been damaged, if there is a deformation. If a two-dimensional image showing the exterior damage is available and is compared with a vehicle of the same type which has been damaged in an accident, it is possible to gauge accidents on the basis of shading, no longer sheer edges or distances, depending on the severity of the accident, by comparing them with other actual accidents (reference damage) for which the level of damage has been ascertained conventionally. Since the recording height, the distance from the camera to the object and the focal length of the lens are routinely unknown, in order for example to produce a reference photo list in this case, it is possible in accordance with the invention to rotate a three-dimensional vehicle by means of a program and to alter its perspective until it exactly matches as many edges and/or contours or fixtures on the vehicle as possible. If the two-dimensional photo of the vehicle which has been damaged in an accident is superimposed in practice onto this three-dimensional image, it is then possible to calculate deviations with respect to the three-dimensional reference car from deviations on the contours, for example on the front wheel arch, the front edge of the bonnet or door edges and/or by evaluating silhouettes or the profile of the trim.

The repair costs required in order to rectify the damage can be ascertained from these deviations, in a simple case for example by measuring comparable damage which has been conventionally calculated according to the above method and for which the level of damage is known. The probability of there being a similarly damaged vehicle is very high, since a large quantity of images to be adduced for gauging and levels of damage which may correspond are available from the conventional examination of motor vehicle accident damage, and can be used. By neutralising the hourly rates and replacement part prices, these can be used such that the comparative vehicles can be adduced, irrespective of price increases in the hourly rate or replacement parts, wherein if damage is determined which necessitates a particular number of hours' work and/or replacement parts, the respectively applicable price lists can be adduced in order to calculate the overall damage.

If conventionally ascertained damage—for example according to DAT or Audatex—is available, it is also possible using the described method to deduce the original shape of the vehicle, on the basis of identifying replacement parts and/or the required repair and enamelling costs.

Given a particular degree of damage, the contours to be expected can be recreated, and an image with the extent of damage to be expected can thus be produced from the two-dimensional image. If the number of available cases is large enough, it is possible for an assignable photograph to be produced, to a sufficient level of accuracy, from the damage present, such as for example in a crash simulation.

In accordance with another aspect, the level of damage to the motor vehicle can alternatively be determined by classifying the motor vehicle or the deformed model in general into different areas, to which a different weighting with respect to damage assessment is continuously or discretely assigned. In a motor vehicle model, it is for example possible to determine that damage in the frontal area is to be assessed at a value X per unit area of damage, wherein damage in another area, such as for example the wing or the body, is to be assessed at Y or Z per unit area of damage.

When comparing with a reference damage model which has already been previously evaluated, in order to determine the level of damage, the hourly rates for motor vehicle experts—which no longer need to be taken into account in determining the damage—can preferably be calculated out. It is also advantageous if, for a reference damage, it is specified which components are damaged or broken, wherein the specific damage in current figures can then be ascertained for example by linking to a component price list. Thus, even price changes in components to be replaced can also be taken into account in determining the damage.

The invention also relates to a computer program which, when it is loaded onto a computer or is running on a computer, performs one or more of the method steps described above. The invention also relates to a program storage medium or computer program product comprising such a program.

In accordance with another aspect, the invention relates to a device for determining the alteration of the shape of a three-dimensional object, comprising a database in which reference data of three-dimensional shapes of a class of objects, such as for example an automobile, are stored as a model shape, and in which data can also be optionally stored which can classify areas of the respectively stored three-dimensional models with respect to the level of damage to be assessed in such an area. Reference damage for the respectively stored three-dimensional models can also be optionally stored which for example comprises damage of different sizes or intensities to different areas of the object and which, depending on what damage there actually is, can also optionally be combined with each other and compared with a recording of a damaged object. It is also possible for price lists for replacement parts to be stored in the database.

Said database is connected to a computational unit, into which at least one and preferably two or more two-dimensional images or photographs of the deformed or damaged object, i.e. for example a car involved in an accident, are inputted. The data can for example be inputted by inputting a data carrier, such as for example a memory card, CD or DVD, or by transmitting them via a network, such as for example a mobile telephone network, landline telephone network or internet. The image data of the deformed or damaged object, inputted in this way, are evaluated by the computational unit in order to determine the location and/or size of a deformation or damage, wherein the inputted image data, optionally also with the aid of supplementary inputted information such as for example a motor vehicle type, are assigned to reference data or compared with reference data, so as to ascertain the location or locations and/or the size of the respective deformation or damage.

The computational unit, on which a method as described above is performed, can preferably also ascertain the financial damage corresponding to a deformation or damage ascertained in this way.

The invention also relates to a system comprising a device as described above for determining the alteration of the shape of a three-dimensional object, and a data recording device such as for example an analogue or digital camera or a mobile telephone which is connected to a camera or comprises an integrated camera.

BRIEF DESCRIPTION OF THE DRAWINGS

The invention is described below on the basis of preferred example embodiments. There is shown.

DETAILED DESCRIPTION OF THE INVENTION

Figure 1:
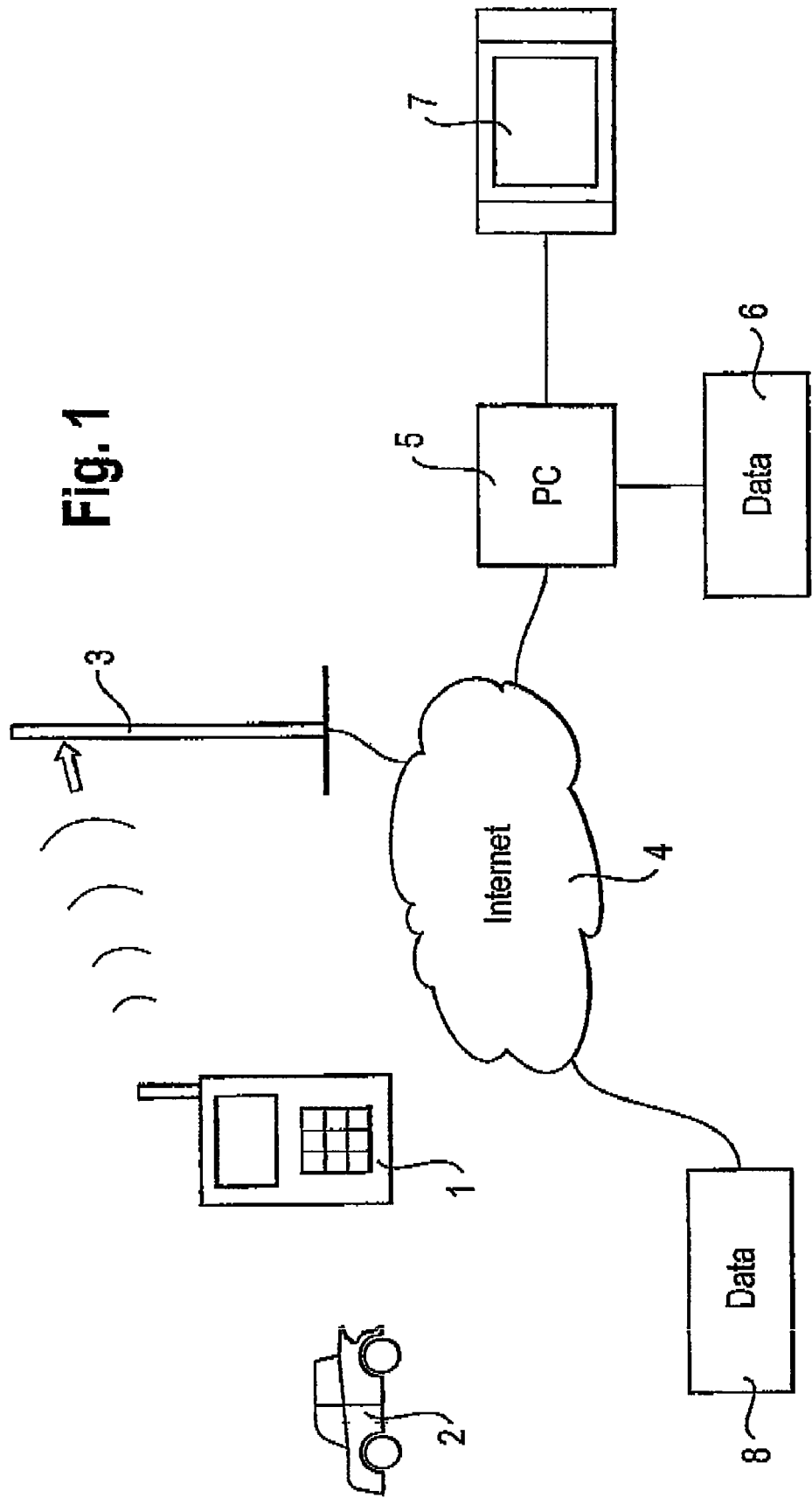
FIG. 1 an embodiment of a system in accordance with the invention for determining a deformation or level of damage.

FIG. 1 shows a mobile telephone 1 comprising an integrated camera, using which damage to a motor vehicle 2 has been recorded from different directions of view onto the motor vehicle 2. The image data produced using the camera of the mobile telephone 1 are transmitted as an MMS to a receiving station 3 of a mobile telephone network, which has a connection to the internet 4. A computational unit 5 is connected to the internet 4 and to a screen 7 and a database 6. From the image data of the vehicle 2 involved in the accident, which are transmitted to the computational unit 5 via the internet 4, the computational unit 5 automatically ascertains the type of the vehicle 2 and retrieves the model data for the shape of the motor vehicle 2 in its undamaged state from the database 6. By comparing the data from the database 6 with the images of the damaged motor vehicle 2, the computational unit 5 ascertains the location and size of the damage to the motor vehicle 2. Said location and size of the damage is used to ascertain, on the basis of an assemblage of reference damage stored in the database 6, which parts of the motor vehicle 2 are broken and must be repaired or replaced. Once the computational unit 5 has ascertained the parts and the work to be performed, an enquiry is sent via the internet to a database 8 which is for example provided by a motor vehicle repair workshop or an automobile parts supplier, in order to enquire as to the cost of the replacement parts and/or the repair work to be performed. Once these data have been relayed from the database 8 back to the computational unit 5 via the internet 4, the computational unit 5 can calculate the damage to the motor vehicle 2 and display it on a screen 7 or transmit it via the internet 4, for example together with the images of the damage to the motor vehicle 2, to an insurance company, to the mobile telephone 1, or to an (online) market for motor vehicles or vehicles involved in an accident.

Figure 2:
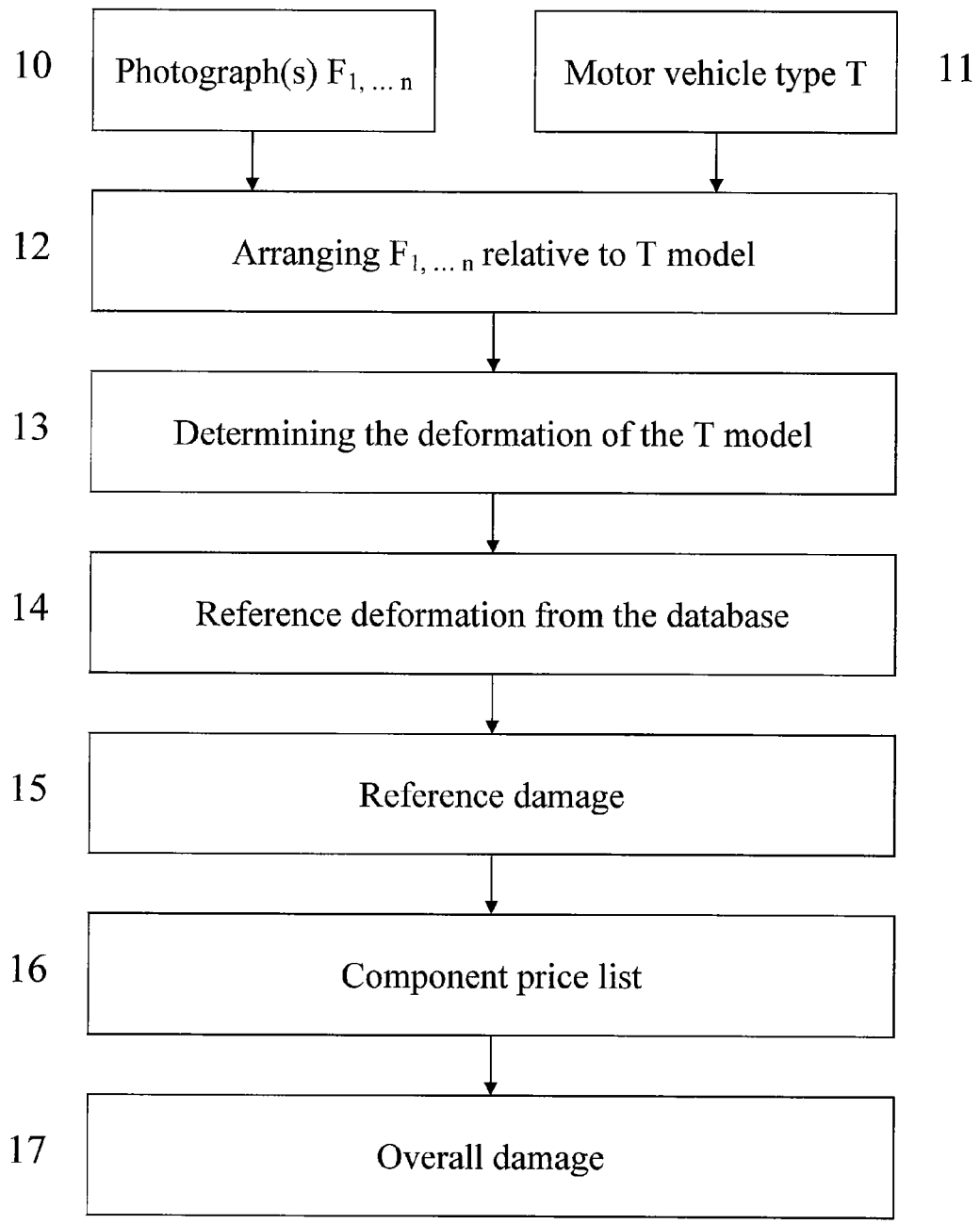
FIG. 2 Flow diagram of an example method for determining the damage to a motor vehicle and for determining the level of damage

FIG. 2 shows a flow diagram in order to illustrate an embodiment of a method in accordance with the invention, wherein the recordings of the damaged motor vehicle 2, produced using a camera which is for example integrated in the mobile phone 1, are referred to as photographs $F_{1,\ldots n}$. These photographs $F_{1,\ldots n}$ are inputted, together with the motor vehicle type T inputted by a user, into a computational unit 5 as inputs 10 and 11. In method step 12, the arrangement of the photographs $F_{1,\ldots n}$ is arranged in the computational unit 5 relative to the model data of a damaged or undamaged reference model T, in order in step 13 to determine the deformation or damage of the motor vehicle 2, for example in relation to a damaged or undamaged reference model T, from the different views in the photographs $F_{1,\ldots n}$.

If a comparison with several reference damage models or a calculation on the basis of back-projections of the photographs $F_{1,\ldots n}$ determines that a particular reference deformation is present, then it is possible in step 14 to determine that a particular or specific reference deformation is present, wherein a reference damage corresponding to this reference deformation can be loaded from the database 6 into the computational unit 5 in step 15. The reference damage can for example specify that there is an estimated damage to the body of a quantifiable size and that in addition, particular replacement parts also have to be repaired or replaced.

In step 16, the information with respect to the current prices of the components to be replaced or repaired, which is still required in order to calculate the overall damage in step 17, is for example retrieved from a database 8, in order to be able to ascertain the overall level of damage 17 in the computational unit 5.

What is claimed:
1. A method comprising:
determining an alteration of a shape of a three-dimensional object from at least one two-dimensional image of the object, wherein the original three-dimensional shape of the object is known or is ascertained from the at least one two-dimensional image of the object as a three-dimensional model shape, including:
rotating, in a computer system including a processor, the three-dimensional model shape such that at least one two-dimensional image or projection of the three-dimensional model shape matches or resembles at least one partial area or contour of the at least one two-dimensional image of the object,
ascertaining at least one area in which the at least one two-dimensional image of the object deviates from the at least one two-dimensional projection of the three-dimensional model shape by comparing the at least one two-dimensional image of the object with the at least one two-dimensional projection, identifying the at least one deviating two-dimensional area as a deformed area and, back projecting the at least one deformed area onto the three-dimensional model shape to ascertain a three-dimensional deformation of the three-dimensional object as the alteration of the shape of the three-dimensional object.

2. A method for determining an alteration of a shape of a three-dimensional object from at least one two-dimensional image of the object comprising, rotating, in a computer system including a processor, a plurality of three-dimensional model shapes corresponding to respectively different reference objects, each model representing a respectively different reference deformation such that the at least one two-dimensional image matches or resembles at least one partial area or contour of the at least one two-dimensional image of each of the plurality of three-dimensional model shapes corresponding to a respective one of the reference objects, back-projecting in the computer system the at least one two-dimensional image of the object onto a plurality of three-dimensional model shapes; and comparing in the computer system the at least one back-projected two-dimensional image of the object with the plurality of the three-dimensional model shapes corresponding to the reference objects comprising the reference deformations to ascertain whether one or more of the reference deformations is present.

3. The method for determining the alteration of the shape of a three-dimensional object according to claim 1 or 2, wherein the object is a motor vehicle or part of a motor vehicle.

4. The method according to claim 1 or 2, wherein one or more three-dimensional non-deformed model shapes and/or one or more model shapes comprising reference deformations are stored in a database as reference shapes for the three-dimensional object.

5. The method according to claim 1 or 2, wherein a matching method for determining the similarity or for determining areas of similarity between the two-dimensional image of the deformed three-dimensional object and a two-dimensional projection of a three-dimensional model shape is used.

6. The method according to claim 1 or 2, wherein at least one of the location, size or dimensions of one or more deformations to the three-dimensional object are ascertained on the basis of the incidence of light and/or silhouette on the two-dimensional image of the object.

7. The method according to claim 1 or 2, wherein the at least one two-dimensional image or recording of the object is produced by means of a digital camera or a mobile telephone.

8. A method for determining the level of damage to an object, according to claim 1 or 2, further comprising comparing the determined level of damage with at least one reference damage which has already been quantified with respect to at least one of a level of damage or on the basis of a classification of the areas of the object with respect to their level of damage if damage has occurred in said area in order to ascertain the level of damage to the object.

9. The method according to claim 8, wherein on the basis of determining the deformation, the method ascertains which replacement parts of the object or motor vehicle have to be repaired or replaced and/or how long repair work will take.

10. The method according to claim 1 or 2, wherein current price information for replacement parts is ascertained from a database in order to calculate the damage to the object or motor vehicle.

11. A non-transitory program storage medium or computer program product comprising a program which, causes a computer to perform a method according to claim 1 or 2.

12. A device for determining the alteration of the shape of a three-dimensional object, comprising:
   a) a database in which one or more of the following data are stored: reference data of three-dimensional shapes of a class of objects as a model shape; data which classify areas of the respectively stored three-dimensional model shapes with respect to the level of damage to be assessed in such an area; reference damage for the respectively stored three-dimensional model shapes which comprises damage of different sizes or intensities to different areas of the object and which are configured to be combined with each other and compared with a recording of a damaged object; and price lists for hourly rates and/or replacement parts; and
   b) a computational unit which is connected to the database and configured to receive, as an input, at least one two-dimensional image or photograph of a deformed or damaged object, wherein the computational unit is configured to evaluate the inputted image data of the deformed or damaged object according to the method of claim 1 or 2, in order to determine at least one of a location or size of a deformation or damage, and wherein the computational unit is configured to assign the inputted image data, with the aid of supplementary inputted information to reference data or to compare the inputted image data with the supplementary inputted information with reference data, so as to ascertain at least one of the location or locations or the size of the respective deformation or damage.

13. The device according to claim 12, wherein the computational unit is configured to ascertain financial damage corresponding to an ascertained deformation or damage.

14. A system comprising a device according to claim 12, and a data recording unit.

* * * * *